US006907709B2

(12) United States Patent
Byrd (10) Patent No.: US 6,907,709 B2
(45) Date of Patent: Jun. 21, 2005

(54) CONCRETE CONSTRUCTION MATERIAL AND METHOD OF USE

(76) Inventor: Randall Byrd, 826 Mahogoney Run, Katy, TX (US) 77494

( * ) Notice: Subject to any disclaimer, the term of this patent is extended or adjusted under 35 U.S.C. 154(b) by 127 days.

(21) Appl. No.: 10/366,889

(22) Filed: Feb. 14, 2003

(65) Prior Publication Data

US 2003/0177737 A1 Sep. 25, 2003

Related U.S. Application Data

(60) Provisional application No. 60/357,739, filed on Feb. 16, 2002.

(51) Int. Cl.[7] .............................................. E04B 1/16
(52) U.S. Cl. .................... 52/742.14; 52/250; 249/27; 264/34
(58) Field of Search .................... 52/742.1, 742.14, 52/250, 741.1; 249/27; 264/31, 34

(56) References Cited

U.S. PATENT DOCUMENTS

| | | | | |
|---|---|---|---|---|
| 3,274,306 A | * | 9/1966 | Kesting ........................ 264/34 |
| 3,490,729 A | * | 1/1970 | Hiller et al. .................. 249/27 |
| 3,689,018 A | * | 9/1972 | Pelle et al. ................... 249/13 |
| 3,693,927 A | * | 9/1972 | Jennings ....................... 249/11 |
| 3,815,861 A | * | 6/1974 | Maier ........................... 249/19 |
| 3,822,853 A | * | 7/1974 | Shelley ......................... 249/27 |
| 3,926,403 A | * | 12/1975 | Markewitz et al. .......... 249/185 |
| 3,993,720 A | * | 11/1976 | Burdett ......................... 264/33 |
| 4,017,052 A | * | 4/1977 | Azzaroni ...................... 249/183 |
| 4,463,925 A | * | 8/1984 | Schimmel ..................... 249/11 |
| 5,338,498 A | * | 8/1994 | Lefebvre ...................... 264/31 |
| 5,737,896 A | | 4/1998 | Rodgers |
| 5,927,043 A | * | 7/1999 | Newkirk ................... 52/742.14 |
| 6,233,891 B1 | | 5/2001 | De Cosse |
| 6,272,810 B1 | | 8/2001 | Ingram et al. |
| 2003/0097812 A1 | * | 5/2003 | Molina ....................... 52/742.1 |

* cited by examiner

Primary Examiner—Robert Canfield
(74) Attorney, Agent, or Firm—Keeling Hudson, LLC; Kenneth A. Keeling (57) ABSTRACT

A method for constructing concrete building units comprises forming and pouring a concrete floor on a floor platform, providing interior wall forms on said concrete floor, providing door frames, conduit and piping on said interior wall forms, providing a ceiling form; transporting said floor platform and floor intermediate spaced exterior wall forms, and pouring a concrete mixture in the wall opening intermediate the interior wall forms and the exterior wall forms. A free-flowing concrete mixture for use in relation to the method comprises a combination of cement, sand, water, polystyrene beads, wire fibers and a conditioning concrete additive.

18 Claims, 6 Drawing Sheets

CONCRETE CONSTRUCTION MATERIAL AND METHOD OF USE

CROSS-REFERENCE TO RELATED APPLICATIONS

This application claims the benefit of U.S. Provisional Application No. 60/357,739, filed Feb. 16, 2002.

STATEMENT REGARDING FEDERALLY SPONSORED RESEARCH OR DEVELOPMENT

Not Applicable.

BACKGROUND OF THE INVENTION

1. Field of the Invention

This invention relates generally to lightweight composite concrete, and particularly to a method for the fabrication of buildings and building elements therewith.

2. Description of the Related Art

Concrete has historically been a material of choice for construction of buildings due to the ability to form the concrete, its strength and durability. Use of concrete in the construction of modular buildings is limited by various factors—two of the significant factors being the weight of the concrete and the limitations of flowability of the concrete.

Specifically, when building wall elements are relatively tall, molds for such walls must be correspondingly deep making it difficult to construct a modular concrete structure that can be economically transported and that maintains sufficient strength and durability. Historically, increased flowability has required an increased proportion of water in the concrete mixture resulting in reduced strength of the resulting product.

Various formulations have been developed to improve the weight to volume ratio of concrete, including various concrete additives (or admixes) and aggregate materials added in varied order. The use of polystyrene as an aggregate is known in the field to reduce weight and add insulating properties to concrete; however, past uses have experienced difficulty with separation of the polystyrene from the mix and penetration of the mix into deep forms. Prior uses have addressed this problem by pouring the forms in a horizontal orientation, so the forms are only as deep as the thickness of the item poured. Once sufficiently cured, the resulting wall component may be rotated into a vertical position. This method, however, does not permit the creation of integrated wall components that are not co-planar, since only one wall could be put into a horizontal position at a time. The separate components may be assembled at intended angles after curing, but such assembled angles do not provide the stability and durability of integrally poured components.

It would be an improvement to the art to develop a composite concrete that freely flows to uniformly fill all the spaces of a deep form containing internal components. In standard concrete, increased flowability of concrete has required addition of water with a significant reduction of concrete strength.

Various methods of forming modular, mobile concrete structures are known. Generally, pre-formed concrete structures involve forming sections, transporting such sections to a construction site and assembling the sections at the construction site. Because of the weight of concrete and forming limitations, such as the formation of angles discussed above, concrete sections are generally planar units or a planar unit with extending connection elements.

It would be an improvement to the prior art to provide a method of constructing modular concrete buildings or components thereof that are formed as integral units, with the integral unit including complete building sections and incorporating various building elements, such as windows, doors, electrical conduits and piping. It would be a further improvement to the prior art to construct such units of a relatively lightweight, insulating concrete having substantial strength and durability formed in an orientation ready for use.

Accordingly, objects of the present invention are to provide:

a method of constructing modular, mobile buildings and building components of a concrete type material;

a material for use in construction of modular, mobile buildings and building components.

Other objects of my invention will become evident throughout the reading of this application.

BRIEF SUMMARY OF THE INVENTION

The present invention provides a method and apparatus for constructing concrete building units and a concrete mixture for use with such method and apparatus. A concrete mixture includes a defined combination of cement, sand, water, polystyrene beads, wire fibers or fiber mesh, and a conditioning concrete additive to provide free-flowing properties when wet and a stable, lightweight cured product.

DESCRIPTION OF THE INVENTION

Figure 1:
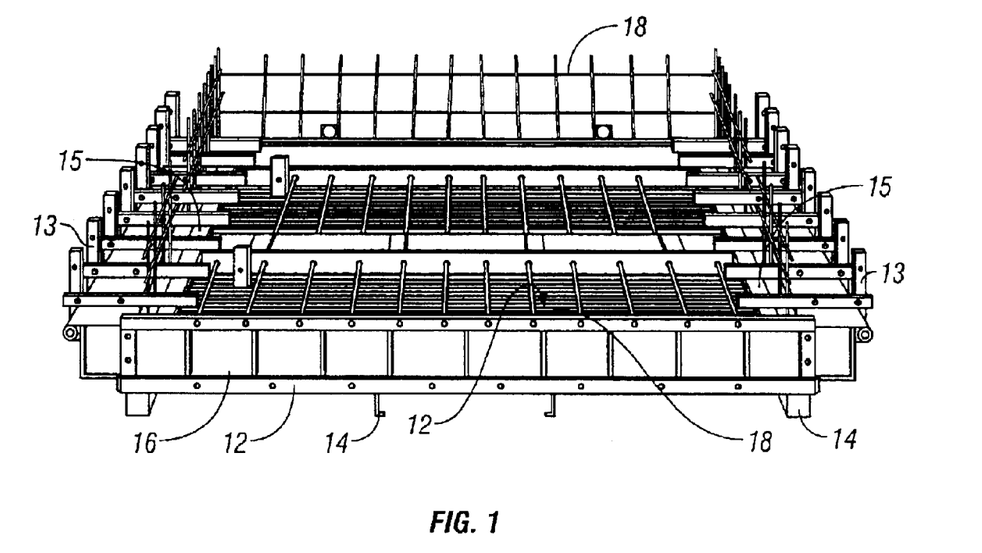
FIG. 1 is a perspective end view of a floor form.
Figure 2:
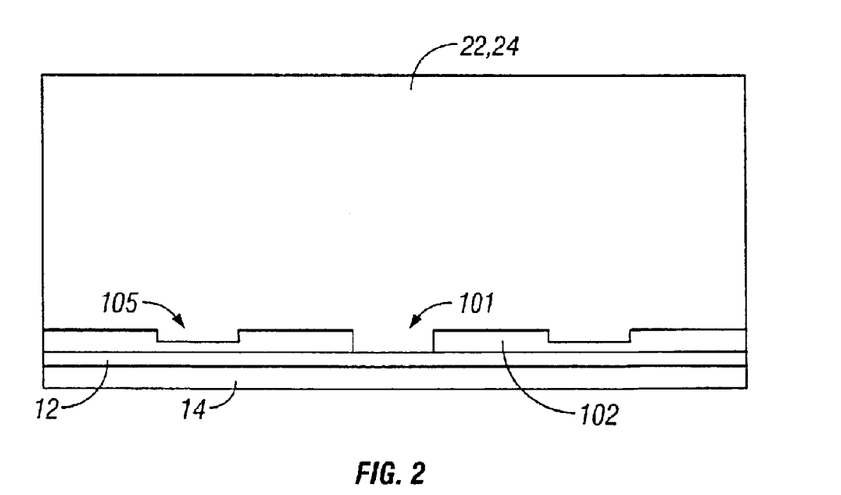
FIG. 2 is a side view of an internal form.
Figure 6:
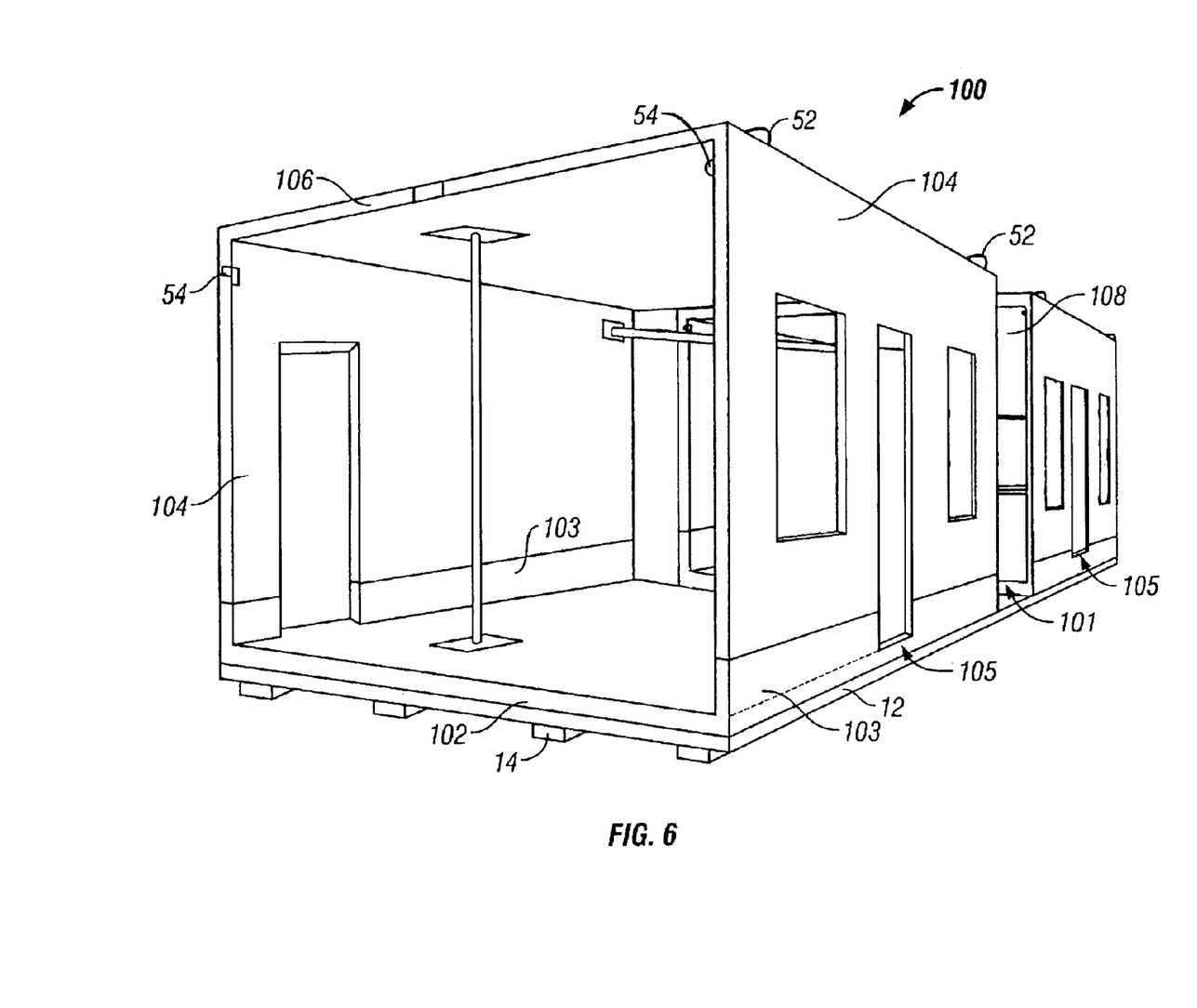
FIG. 6 is a perspective view of completed structures removed from the internal form and external form shell.

Referring first to FIGS. 1, 2 and 6, the exemplary process of the present invention for constructing an integrated structure 100 using composite concrete starts with assembling the form for the floor. A platform 12 is prepared as the base for the structure floor. Platform 12 is raised above the ground by spacers 14 so that it can be subsequently moved. A floor frame 16 is assembled around platform 12, frame 16 being sufficiently high to define the thickness of the structure floor 102.

Referring to FIGS. 1, 2, 3 and 6, rebar 18 is installed in the area above platform 12 and within frame 16. Upwardly extending segments of rebar 18 from floor 102 are provided in appropriate peripheral areas to tie into structure walls 104 and rear wall 108 subsequently in the process. Rebar 18 installation is in accordance with industry practice. The term rebar is used to refer to internal support and joining members integral to the cured floor, walls and ceiling. Additionally, any drains, pipes or openings (not shown) to be provided in the structure floor 102 are installed or framed on platform 12.

Floor frame 16 has curb frames 15 along two opposing sides, which correspond to structure walls 104 in the completed integrated structure 100. Curb frame support 13 holds curb frame 15 in a position above horizontal rebar 18, so the bottom of curb frame 15 is at the intended level of the top of structure floor 12. Curb frame support 13 holds curb frame 15 in a position inside upwardly extending segments of rebar 18 so that the side of curb frame 15 facing adjacent upwardly extending segments of rebar 18 defines the interior surface of curb 103. Rebar 18 has a continuous route between floor 12 and curb frame 15 and between floor frame 16 and curb frame 15 from the horizontal orientation to the vertical orientation. Areas of curb 103 may be partitioned off under curb frame 15 in order to form structure separations 101 and door sills 105.

When floor frame 16 is assembled with the rebar 18, a quantity of concrete (not shown) is poured within frame 16 on platform 12. In the exemplary embodiment, a prior art concrete mixture is used to create floor 102. Concrete handling methods known to the field are used to pour the concrete into the form and the wet concrete mixture is leveled and textured as desired to provide a suitable floor surface. The floor is allowed to cure.

Figure 7:
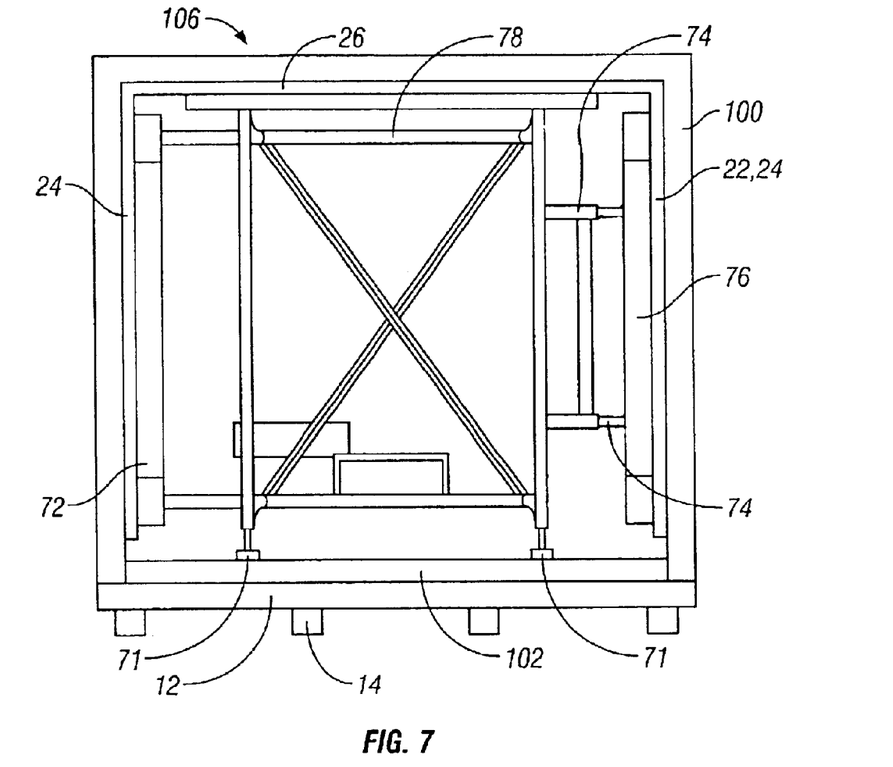
FIG. 7 is an end view of a bracing unit positioned in an internal form.

Referring to FIGS. 6 and 7, floor 102 is framed and constructed with curb 103 extending upwardly from a portion of the perimeter of floor 102.

Referring to FIG. 2, a side view of interior wall form 22 for wall 104 construction is depicted. Generally, form 22 is an elongated cube, consisting of two vertical sides, one horizontal top section, and one vertical end section perpendicular to both vertical sides 24 and top section 26. Form 22 has interior dimensions equivalent to the desired exterior dimensions of the finished structure 100. In the exemplary embodiment, interior wall form 22 is a double wall form for forming two modular units at the same time. Form 22 may be made with additional extensions in order to simultaneously form multiple modular units at a single time, limited by practicality, space and the quantity of concrete needed to pour all of the structures.

Upon sufficient curing of floor 102 of the structure 100, the frames 16 are removed from platform 12 and form 22 is positioned on the floor 102. The peripheral upwardly extending rebar 18 extends upwardly from curb 103.

Figure 3:
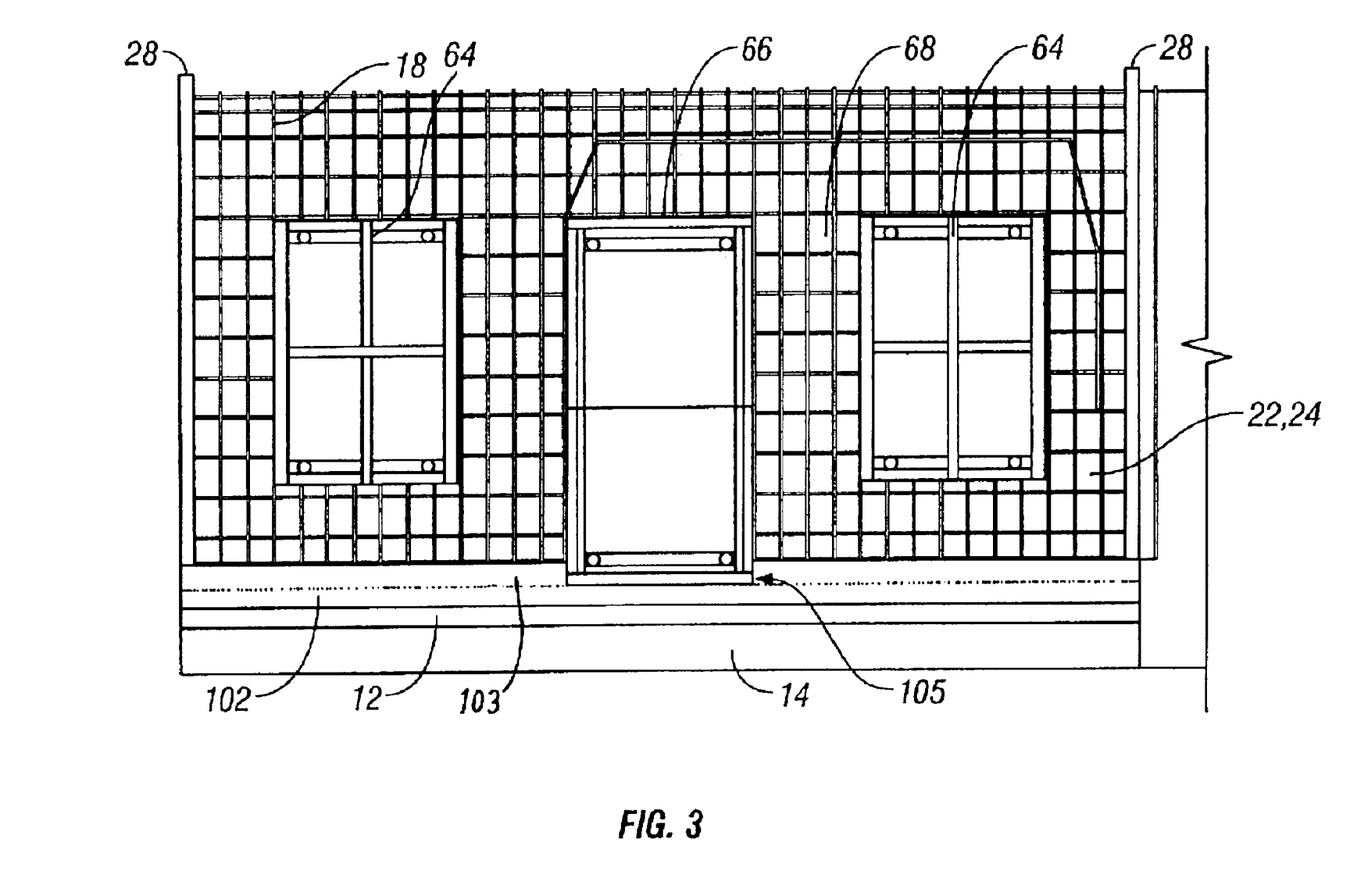
FIG. 3 is a side view of a section of an internal form with internal wall elements in place.

Referring to FIG. 3 and 6, window frames 64 and doorframes 66 are arranged on form 22 at desired locations. Rebar 18 is placed on form 22 with spacers to space the rebar 18 from form 22 so that rebar 18 is interior of the finished structure wall 104. Electrical conduit 68, gas pipes (not shown), water pipes (not shown) and other structures or openings desired in the structure wall 104 are inserted or framed on exterior of form 22.

Figure 4:
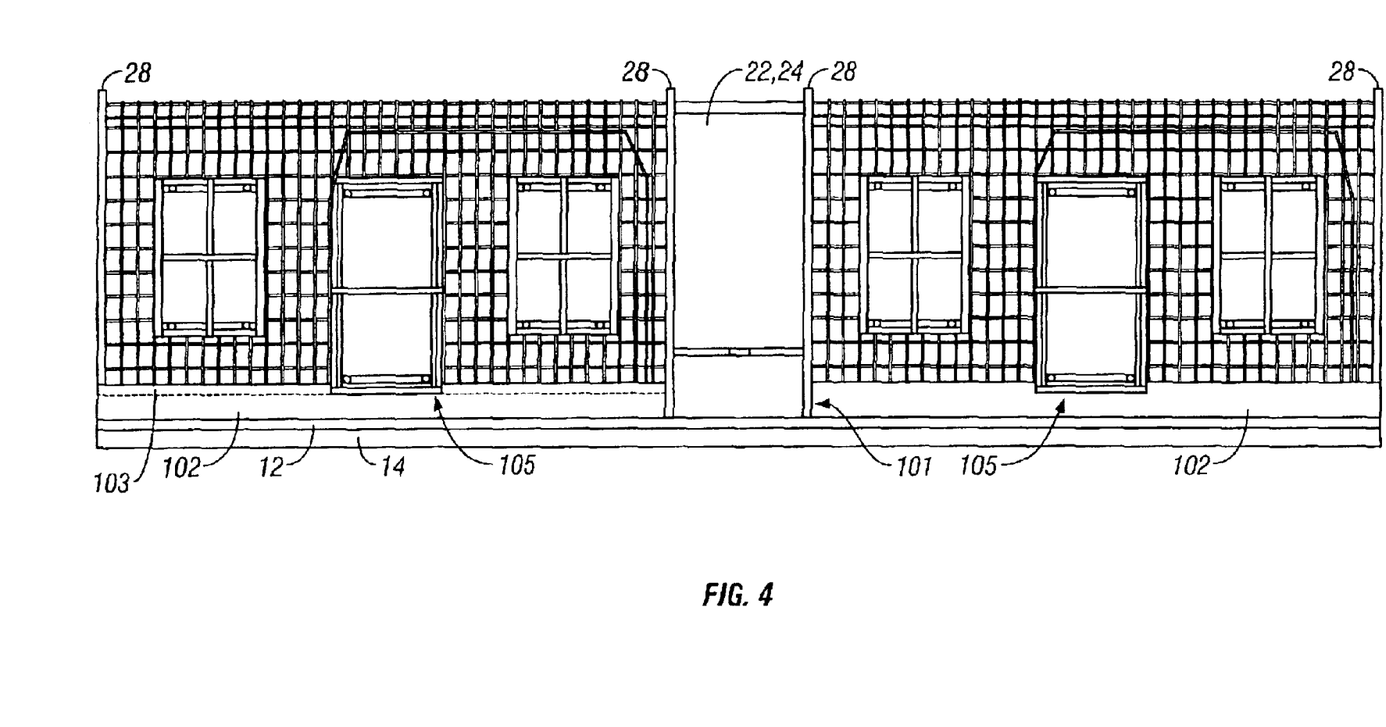
FIG. 4 is a side view of an entire double internal form with internal wall elements in place.

As depicted in FIG. 4 and 6, one form 22 may be used to define the interior surface of walls 104 of a plurality of structures 100. As depicted in FIGS. 3, 4 and 6, wall end forms 28 are provided to define ends of structure walls 104.

Figure 5:
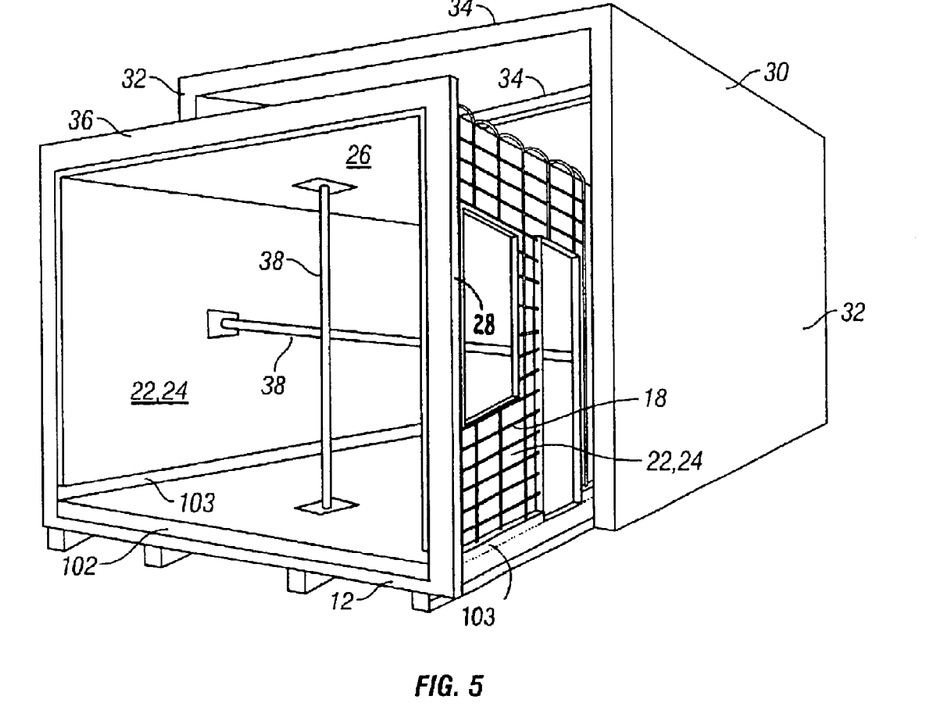
FIG. 5 is a perspective view of an internal form nesting into a form shell.

As also indicated in FIGS. 3, 4 and 5, rebar 18, as installed, extends upward from floor 102 outside form 22 and over the upper edge of form 22 onto ceiling 106 of structure 100. Floor rebar 18 is integrated with wall and ceiling rebar 18 exterior of form 22.

Referring to FIG. 5 and 6, form shell 30 provides the exterior form for the creation of structure walls 104. Form shell 30 comprises a plurality of shell walls 32. A plurality of frame upper members 34 may also be present to provide rigidity. Shell 30 is so sized in relation to form 22 that the exterior of form 22 and the interior of shell 30 define the interior and the exterior, respectively, of walls 104 of the structure 100. In the exemplary embodiment, form shell 30 is comprised of two shell walls 32 and a plurality of frame upper members 34. A rear wall (not shown) may also be present, such that three walls of a rectangular house may be formed at once.

Shell 30 is open at the top to allow for pouring of concrete material of the structure ceiling 106. As with forming floor 102 and walls 104, any conduits or pipes required in structure ceiling 106 are placed on form 22 top.

In arranging shell 30 in relation to form 22, an exemplary method is to provide shell 30 as a relatively fixed structure and to slide form 22, including floor 102 and platform 12 into shell 30, as partially depicted in FIG. 5. An exemplary method to move the floor 102, platform 12 and form 22 is a compressed air lift system; however, various other methods are readily available, including wheeled mechanisms, tracks and the like. Floor 102 may be removed from platform 12, when floor 102 is sufficiently cured, and moved by various methods known to the field.

Upon full insertion of form 22 into shell 30, wall end forms 28 should fit closely with corresponding interior surfaces of shell 30. Accordingly, floor 102 wall end forms 28, form 22 and shell 30 define at least two walls 104 of the structure 100. Additionally, window frames 64 and doorframes 66 are arranged to fit closely with corresponding interior surfaces of shell 30. A ceiling endpiece 36 is attached to form end to define an end of ceiling 106 of the structure 100.

Figure 8:
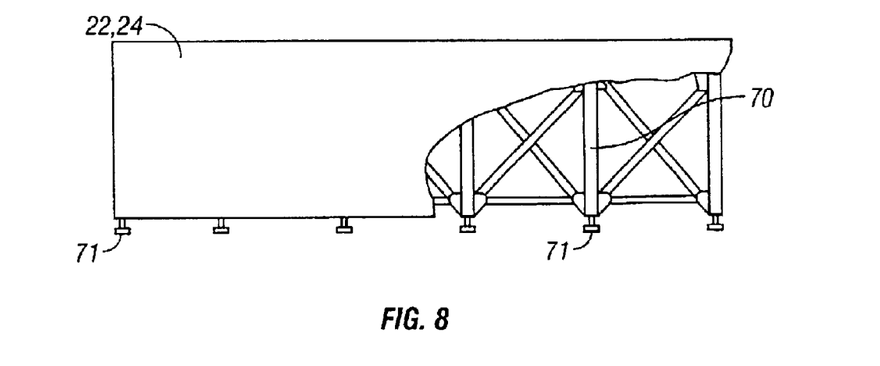
FIG. 8 is a cut-away side view of the bracing unit within an internal form.

In FIGS. 7 and 8, a bracing unit 70 is installed into the inner cavity of form 22 from the open end. The bracing unit 70 is moved with airlift or rolled into position. Once in position, bracing unit 70 rests on lifting legs 71. Lifting legs 71 are extendable and are extended until the bracing unit raises form 22 to the desired height in shell 30, to create the proper height to ceiling 106. Form 22 is raised off floor 102, but not higher than curb 103. Once the proper height is attained, side expanders 74 extend to push static braces 72 of bracing unit 70 against one side of form 22, and bracing wall 76, on the other side of bracing unit 70 against the other side of form 22.

Upon bracing form 22 into shell 30, concrete material may be poured in the cavity defined by form 22 and shell 30 to form walls 104 of the structure 100 (not shown in FIG. 5) and further to create the structure ceiling 106. The concrete mixture of the present invention is handled generally the same as conventional concrete; however, due to the properties of the material, commonly used methods of rodding or vibrating the concrete mixture during the placement is not required.

After the concrete material hardens sufficiently, the formed structure 100 may be removed from form 22 and shell 30. As an alternative to bracing unit 70, internal braces 38 may be provided within form 22. Upon curing of the concrete material, the internal braces 38 or bracing unit 70 are removed, and sections of form 22 are removed from within the structure walls 104 and ceiling 106. Internal braces 38 are schematically depicted in FIG. 5.

A plurality of lifting eyes 52 are inserted into the concrete mix while wet to allow ready lifting of the finished structure 100. The lifting eyes 52 allow the structure 100 to be moved and loaded onto trucks or railcars by cranes. Lifting eyes 52 are a permanent part of the structure 100, so movement techniques and the necessary equipment can easily be anticipated, and provide for multiple movements of the structure 100.

Connectors 54 may also be formed into the floor 102, wall 106 and ceiling 106 segments to allow for connection of structure ends as necessary or to allow for connection of various structures 100 with each other. The open wall of structure 100 may be closed off by connecting a separate wall piece (not shown) formed by methods known to the field. The separate wall piece may have a decorative to present a desirable building front appearance.

The process described above can be practiced to construct a structure with three walls 104 by providing a form 22 end proximate an end of shell 30 or can be practiced to construct a structure 100 with both ends open. The process described above can be further practiced to construct interconnecting structures 100.

After the structures 100 are adequately cured, structures 100 are ready for finishing. The present concrete mixture provides a relatively uniform, relatively smooth surface for finishing.

A typical wall 104 thickness of a structure 100 of the present invention is 5 inches (12.7 cm). The present invention may be practiced to construct structures 100 with wall widths from about 3 inches (7.62 cm) and wider. With rebar 18, window frames 64, door frames 68, conduit 68 and various piping and other inserts, there are many areas of volume defined by form 22 and shell 30 that conventional concrete would not reach when poured from above according to the method of the present invention.

Figure 9:
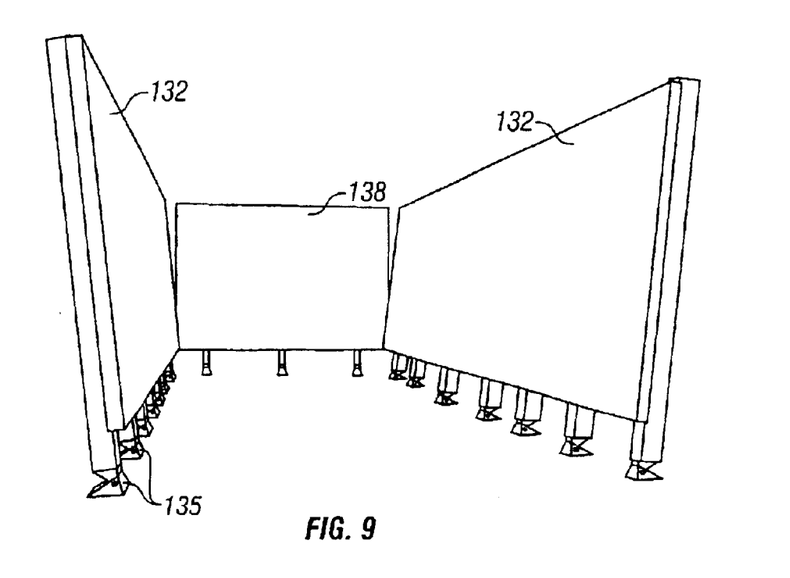
FIG. 9 is a perspective view of an alternate external form shell.

Referring to FIGS. 9 and 6, in an alternate configuration, shell walls 132 are independent moveable structures, vertically anchorable to the ground a set distance apart. Shell walls 132 can be set into place to encase three sides of form 22 and define structural walls 104 and rear wall 108, and then removed to release a newly formed structure 100. In the exemplary embodiment, shell walls 132 are attached to a base work site by hinges 135 such that walls 132 may be rotated about the horizontal axis of hinges 135. Platform 12 and form 22 fit between shell walls 132, such that when shell walls 132 are arranged in a vertical position, the interior of shell side walls 134 and the exterior of form 22 define an area volume to form walls 104. A shell rear wall 138 may be employed in order to permit the simultaneous formation of a rear wall 108, where the interior of shell rear wall 138 and the exterior of form 22 define an area volume to form rear wall 108.

A flowable, relatively lightweight concrete mixture is required to practice the method of the present invention.

EXAMPLE I

A concrete mixture and method capable of providing a concrete product with acceptable flow and strength characteristics comprises:
Cement=70 lbs (26.13 kg)
Sand=130 lbs (48.52 kg)
Water=27 lbs (10.08 kg)
Polystyrene Beads=1 cubic foot (0.028 cubic meters)
Fiber Mesh (Fiber Mesh®)=12 lbs (4.48 kg)
Admix (Glenium® 3030 NS)=7 oz (207.01 ml)

Add 70% of the water to a suitable receptacle. Add all of the sand, and mix until the sand is wet and the mixture is flowable. Add all of the cement and continue to mix. Next, add all of the fiber mesh, then all of the polystyrene beads. Continue to mix, adding the remaining 30% of water. Finally, add the admix. When cured, the mixture produces a solid concrete weighting 86.8 pounds per cubic foot (1079.6 kilograms per cubic meter). Total volume of the mixture may be increased, but the proportional relationships and the addition sequence and process must still be followed.

EXAMPLE II

A second concrete mixture and method capable of providing a concrete product with acceptable flow and strength characteristics comprises:
Cement=70 lbs (26.13 kg)
Sand=130 lbs (48.52 kg)
Water=26.5 lbs (9.89 kg)
Polystyrene Beads=1 cubic foot (0.028 cubic meters)
Metal Fiber (Wiremix® W50)=12 lbs (4.48 kg)
Admix (Glenium® 3030 NS)=5 oz (147.87 ml)

Add 70% of the water to a suitable receptacle. Add all of the sand, and mix until the sand is wet and the mixture is flowable. Add all of the cement and continue to mix. Next, add all of the metal fiber, then all of the polystyrene beads. Continue to mix, adding the remaining 30% of water. Finally, add the admix. When cured, the mixture produces a solid concrete weighting 98.8 pounds per cubic foot (1228.86 kilograms per cubic meter). Total volume of the mixture may be increased, but the proportional relationships and the addition sequence and process must still be followed.

Various forms of fiber mesh and metal fibers can be used in the mixture. Combinations of the two can also be used. In some instances it is appropriate to exclude rebar from the forms, if the fiber mesh and/or metal fiber combinations provides enough support for the particular application. The specific admixture used is Glenium® 3030NS, a polycarboxylate admix. Other admixes having similar properties may be used in appropriate concentrations. The concrete mixture provides improved thermal insulating properties over conventional prior art concrete.

The foregoing drawings, discussion, and description of the invention is illustrative and explanatory, but are not meant to be limitations on the practice thereof. Various changes in the details of the illustrated construction may be made within the scope of the appended claims without departing from the spirit of the invention. The present invention should only be limited by the following claims and their legal equivalents.

I claim:

1. A method for constructing a building unit comprising:
   a floor forming step comprising providing a floor form on a floor platform;
   a floor pouring step;
   a floor curing step;
   an interior wall form step comprising providing at least two interior wall forms extending vertically upward from said cured floor;
   a ceiling form step comprising providing a ceiling form above said floor, said ceiling form adjoining said at least two interior wall forms;
   an exterior wall form step comprising providing at least two exterior wall forms;
   a floor placement step comprising transporting said floor to a position intermediate said at least two exterior wall forms after said floor pouring step;
   an interior wall form placement step comprising placing said at least two interior wall forms intermediate said at least two exterior wall forms;
   a wall and ceiling pouring step;

a wall and ceiling curing step;

an exterior wall form removal step; and an interior wall form removal step.

2. The method of claim 1, wherein:

an underside of said floor platform raised at least in part from the ground; and said floor form including a curb form around at least a part of said floor form perimeter.

3. The method of claim 1, wherein:

said floor placement step further comprising spacing each said at least two exterior wall forms from one said interior wall forms; and said spacing defining a wall distance between an exterior wall form and an interior wall form.

4. The method of claim 3, wherein:

said wall distance in a range of 3 inches (~7.6 cm) to 6 inches (~15.2 cm).

5. The method of claim 1, wherein:

said interior wall forming step further comprising arranging door frames and window frames at determined locations on said at least two interior wall forms.

6. The method of claim 1, wherein:

said exterior wall form step further comprising providing at least two exterior wall forms connected to each other to provide an exterior wall shell.

7. The method of claim 1 wherein:

said exterior wall form step further comprising providing at least two exterior wall forms each having hinges proximate a wall form end to allow rotation of each said wall form about a wall form hinge;

said exterior wall form step further comprising rotating said at least two exterior wall forms proximate said interior wall forms; and said exterior wall form removal step further comprising rotating said at least two exterior wall forms away from said interior wall forms.

8. The method of claim 1 wherein:

said interior wall form step further comprising providing a wall form support operable between a retracted position and an expanded position; and said wall form support holding said at least two interior wall forms in a determined location in said expanded position.

9. The method of claim 1, wherein:

said ceiling form step further comprising providing a ceiling support and lifting leg operable between a raised position and a lowered position; and said ceiling form support holding said ceiling form in a determined location in said raised position.

10. The method of claim 1, wherein:

said interior wall step further comprising providing a form support operable between a retracted position and an expanded position;

said wall form support holding said at least two interior wall forms in a determined location in said expanded position;

said form support further comprising a ceiling support and lifting leg operable between a raised position and a lowered position; and said ceiling form step further comprising said form support holding said ceiling form in a determined location in said raised position.

11. The method of claim 1 wherein:

said wall and ceiling pouring step comprising pouring a concrete mixture intermediate said interior wall form and said exterior wall form and pouring said concrete mixture on said ceiling form; and said concrete mixture comprising on a unit basis: 70 pounds of dry cement, 130 pounds of dry sand; 12 pounds of mesh filler; water in the range of 25 to 30 pounds; one cubic foot of polystyrene beads; and a quantity of admix ranging from 3 to 10 ounces.

12. The method of claim 11 wherein said concreted mixture is formed by:

combining said sand and 70% of said water;

mixing said sand and said 70% of said water until said sand is uniformly wet and flowable;

mixing said cement with said sand and said 70% of said water;

mixing said mesh filler with said cement, said sand and said 70% of said water;

mixing said polystyrene with said cement, said sand and said 70% of said water;

mixing a remaining 30% of said water with said polystyrene, said cement, said sand and said 70% of said water; and mixing said admix with said water, said polystyrene, said cement and said sand.

13. The method of claim 11, wherein:

said quantity of water is 27 pounds.

14. The method of claim 11, wherein:

said quantity of water is 26.5 pounds.

15. The method of claim 11, wherein:

said admix is a polycarboxylate compound.

16. A method for constructing a building unit comprising:

a floor forming step;

a floor pouring step;

a floor curing step;

an interior wall form step comprising providing at least two interior wall forms extending vertically upward from said cured floor;

a ceiling form step comprising providing a ceiling form above said floor, said ceiling form adjoining said at least two interior wall forms;

a floor placement step comprising placing said floor and said at least two interior wall forms intermediate at least two exterior wall forms, each said at least two exterior wall forms having a hinge proximate a wall form end;

an exterior wall rotation step comprising providing at least two exterior wall forms, rotating each said at least two exterior wall forms about a wall form hinge to a position proximate a corresponding interior wall form;

a wall and ceiling pouring step;

an exterior wall form removal step comprising rotating each said at least two exterior wall forms away from said interior wall forms; and an interior wall removal step.

17. The method of claim 16 further comprising:

said floor forming step comprising providing a floor form on a floor platform; and said floor placement step further comprising transporting said floor to said place intermediate said two exterior wall forms after said floor pouring step.

18. A method for constructing a building unit comprising:
- a floor forming step comprising providing a floor form on a floor platform;
- said floor form including a curb form around at least a part of said floor form perimeter;
- a floor pouring step;
- a floor curing step;
- an interior wall form step comprising providing at least two interior wall forms extending vertically upward from said cured floor;
- a ceiling form step comprising providing a ceiling form above said floor, said ceiling form adjoining said at least two interior wall forms;
- an exterior wall form step comprising providing at least two exterior wall forms;
- a floor placement step comprising transporting said floor to a position intermediate said at least two exterior wall forms after said floor pouring step;
- an interior wall form placement step comprising placing said at least two interior wall forms intermediate said at least two exterior wall form,
- a wall and ceiling pouring step;
- a wall a d ceiling curing step;
- an exterior wall form removal step; and
- an interior wall form removal step.

* * * * *